(12) United States Patent
Powell

(10) Patent No.: US 10,729,072 B2
(45) Date of Patent: Aug. 4, 2020

(54) HARVEST VACUUM ASSEMBLY

(71) Applicant: Eugene Powell, Stanwood, WA (US)

(72) Inventor: Eugene Powell, Stanwood, WA (US)

( * ) Notice: Subject to any disclaimer, the term of this patent is extended or adjusted under 35 U.S.C. 154(b) by 85 days.

(21) Appl. No.: 16/127,868

(22) Filed: Sep. 11, 2018

(65) Prior Publication Data

US 2020/0077590 A1  Mar. 12, 2020

(51) Int. Cl.
*A01D 51/00* (2006.01)
*A01D 90/02* (2006.01)
*A01D 87/10* (2006.01)

(52) U.S. Cl.
CPC .......... *A01D 51/007* (2013.01); *A01D 87/10* (2013.01); *A01D 90/02* (2013.01)

(58) Field of Classification Search
CPC ...... A01D 51/007; A01D 87/10; A01D 90/02; A01D 45/22; A01D 75/02
See application file for complete search history.

(56) References Cited

U.S. PATENT DOCUMENTS

| | | | |
|---|---|---|---|
| 2,065,721 A * | 12/1936 | Mutzbauer | A01D 87/10 56/13.2 |
| D153,673 S | 5/1949 | Elliotte | |
| 2,538,454 A * | 1/1951 | Hart, Jr. | A01D 46/10 56/30 |
| 3,543,498 A * | 12/1970 | Weichel | A01D 90/02 56/364 |
| 3,732,672 A * | 5/1973 | Adee | A01D 85/004 56/13.3 |
| 3,961,465 A * | 6/1976 | Winings | A01D 45/22 56/13.1 |
| 3,984,893 A * | 10/1976 | Ashley | E01H 1/0836 15/339 |
| 4,200,950 A | 5/1980 | Coverley | |
| 4,443,997 A | 4/1984 | Namdari | |
| 4,730,444 A * | 3/1988 | Leffel | A01D 45/30 56/12.9 |
| 5,070,687 A | 12/1991 | Schweigert | |
| 5,134,837 A * | 8/1992 | Casey | A01D 45/30 56/12.8 |
| 5,191,754 A * | 3/1993 | Morey | A01D 84/00 56/13.3 |
| 5,226,757 A | 7/1993 | Tarrant | |
| 5,381,646 A * | 1/1995 | Casey | A01D 45/30 56/13.1 |
| 6,588,053 B1 | 7/2003 | Nowak | |

(Continued)

*Primary Examiner* — Abigail A Risic

(57) ABSTRACT

A harvest vacuum assembly includes a vacuum motor coupled to a farming implement. The vacuum motor urges air inwardly through an intake and outwardly through an exhaust when the vacuum motor is turned on. A suction tube is removably coupled to the hydraulic lift on the front end of the farming implement. The suction tube has a suction aperture therein that is directed downwardly toward ground when the suction tube is coupled to the hydraulic lift. Moreover, the suction tube is in fluid communication with the vacuum motor such that the vacuum motor urges air inwardly through the suction aperture. Thus, the suction aperture sucks loose objects on the ground for collection. The exhaust on the vacuum is in fluid communication with a harvester is towed behind the farming implement to transfer the loose objects into the harvester for harvesting.

5 Claims, 5 Drawing Sheets

(56) References Cited

U.S. PATENT DOCUMENTS

| | | |
|---|---|---|
| 7,325,512 B2 | 2/2008 | Overstreet |
| 2006/0027175 A1* | 2/2006 | Overstreet ............. A01D 87/10 119/60 |
| 2010/0071334 A1* | 3/2010 | Owen ................... A01D 46/10 56/30 |
| 2016/0235011 A1 | 8/2016 | Glisson |

* cited by examiner

HARVEST VACUUM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to vacuum devices and more particularly pertains to a new vacuum device for suctionally collecting loose objects for harvesting.

BRIEF SUMMARY OF THE INVENTION

An embodiment of the disclosure meets the needs presented above by generally comprising a farming implement that has a front end and a back end. The front end has a hydraulic lift thereon for engaging and lifting farming equipment. A vacuum motor is coupled to the farming implement and the vacuum motor has an intake and an exhaust. The vacuum motor urges air inwardly through the intake and outwardly through the exhaust when the vacuum motor is turned on. A suction tube is removably coupled to the hydraulic lift on the front end of the farming implement. The suction tube has a suction aperture therein that is directed downwardly toward ground when the suction tube is coupled to the hydraulic lift. Moreover, the suction tube is in fluid communication with the vacuum motor such that the vacuum motor urges air inwardly through the suction aperture. Thus, the suction aperture sucks loose objects on the ground for collection. The exhaust on the vacuum is in fluid communication with a harvester is towed behind the farming implement to transfer the loose objects into the harvester for harvesting.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
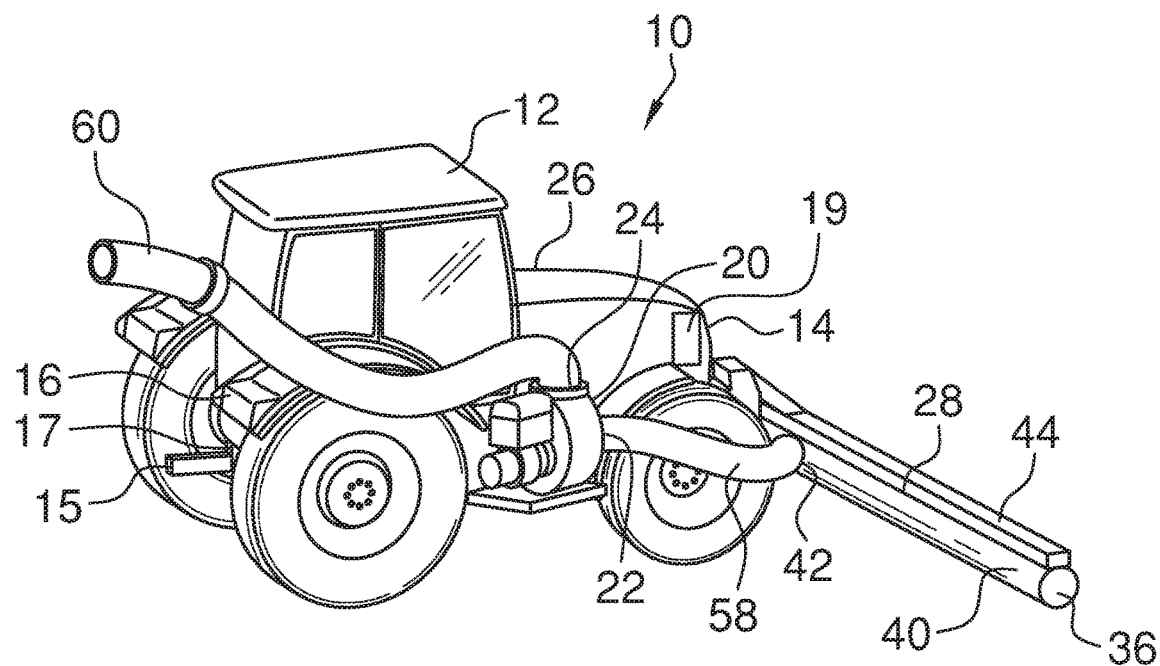
FIG. 1 is a perspective view of a harvest vacuum assembly according to an embodiment of the disclosure.
Figure 2:
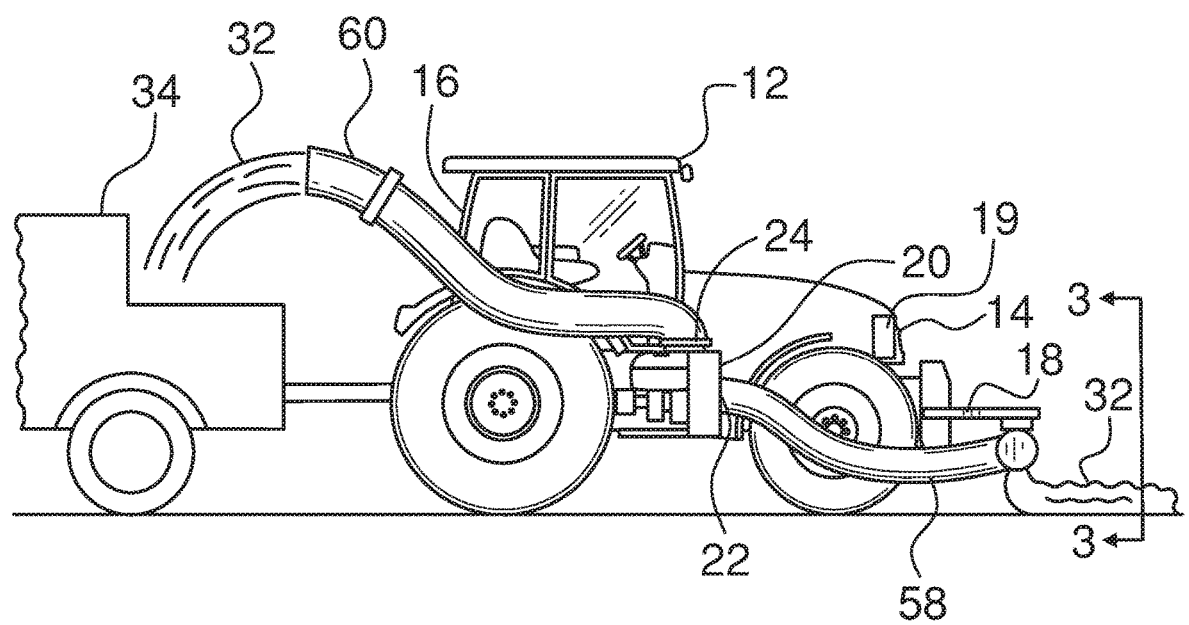
FIG. 2 is a right side view of an embodiment of the disclosure.
Figure 3:
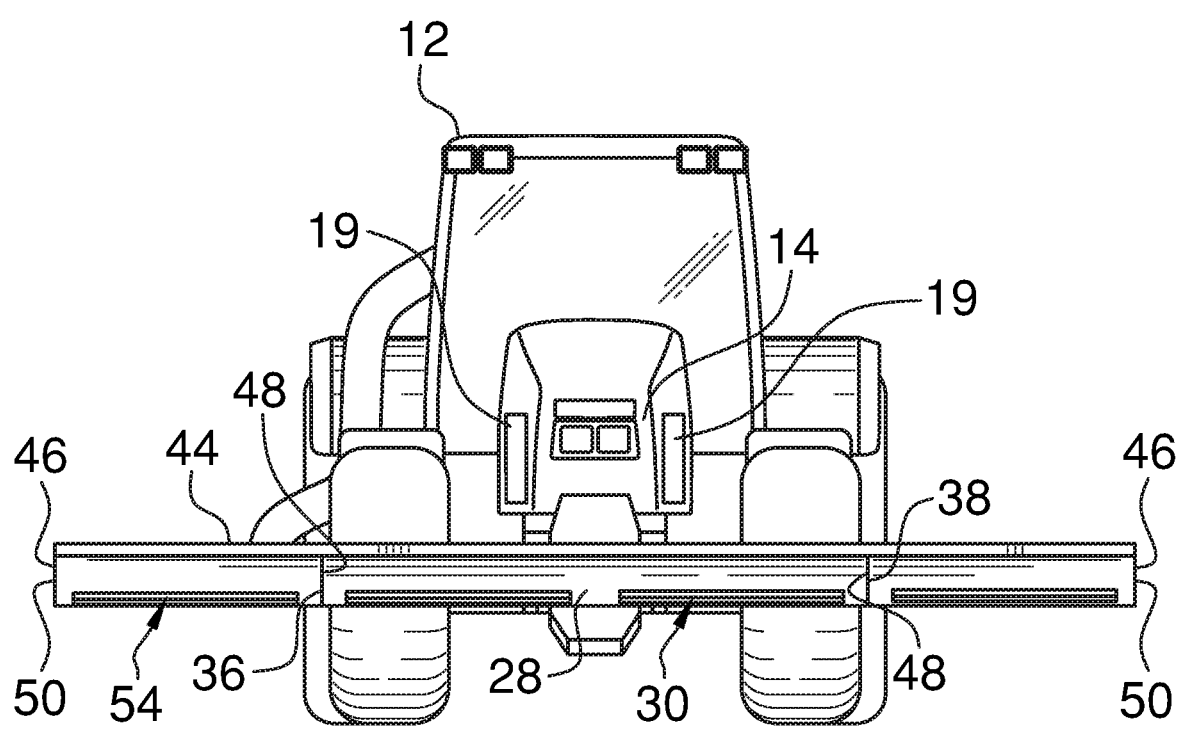
FIG. 3 is a front view of an embodiment of the disclosure.
Figure 4:
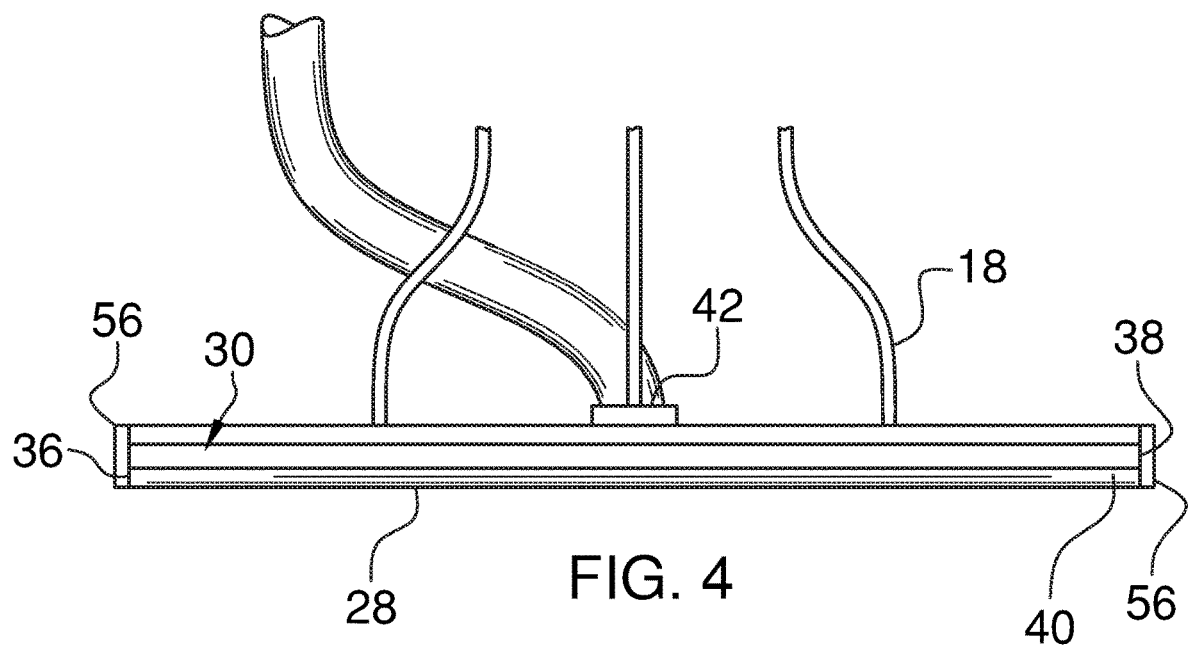
FIG. 4 is a bottom view of a suction tube of an embodiment of the disclosure.
Figure 5:
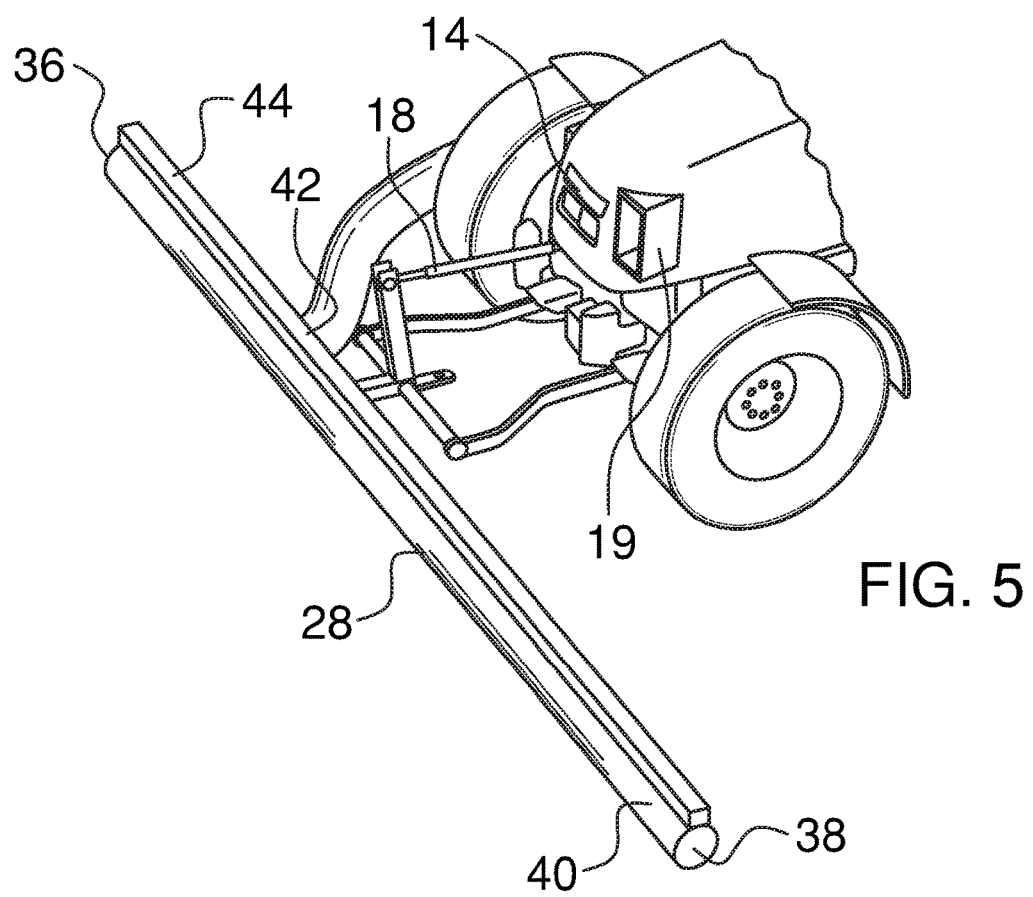
FIG. 5 is a front perspective view of an embodiment of the disclosure.
Figure 6:
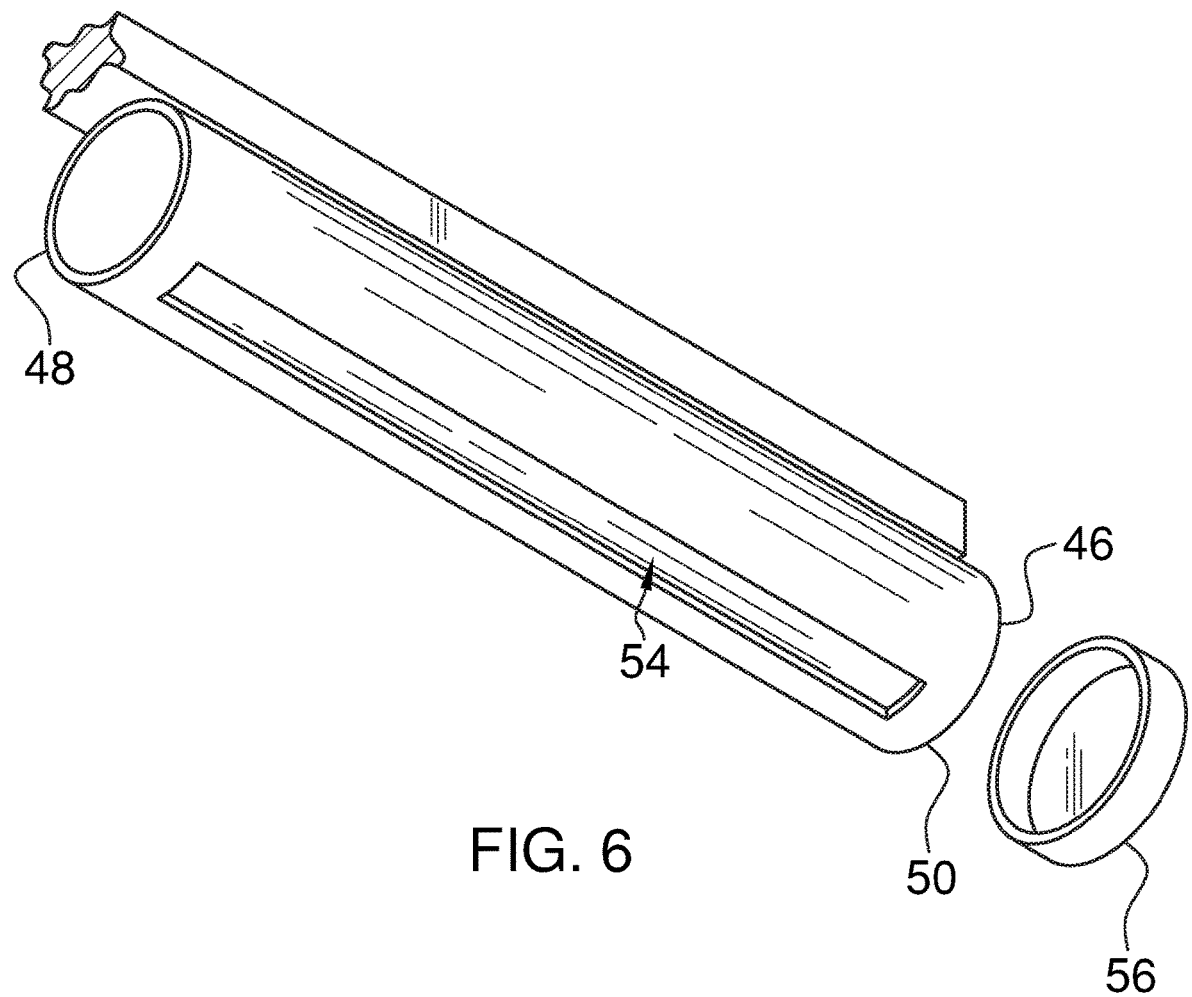
FIG. 6 is a bottom perspective view of an extension tube of an embodiment of the disclosure.
Figure 7:
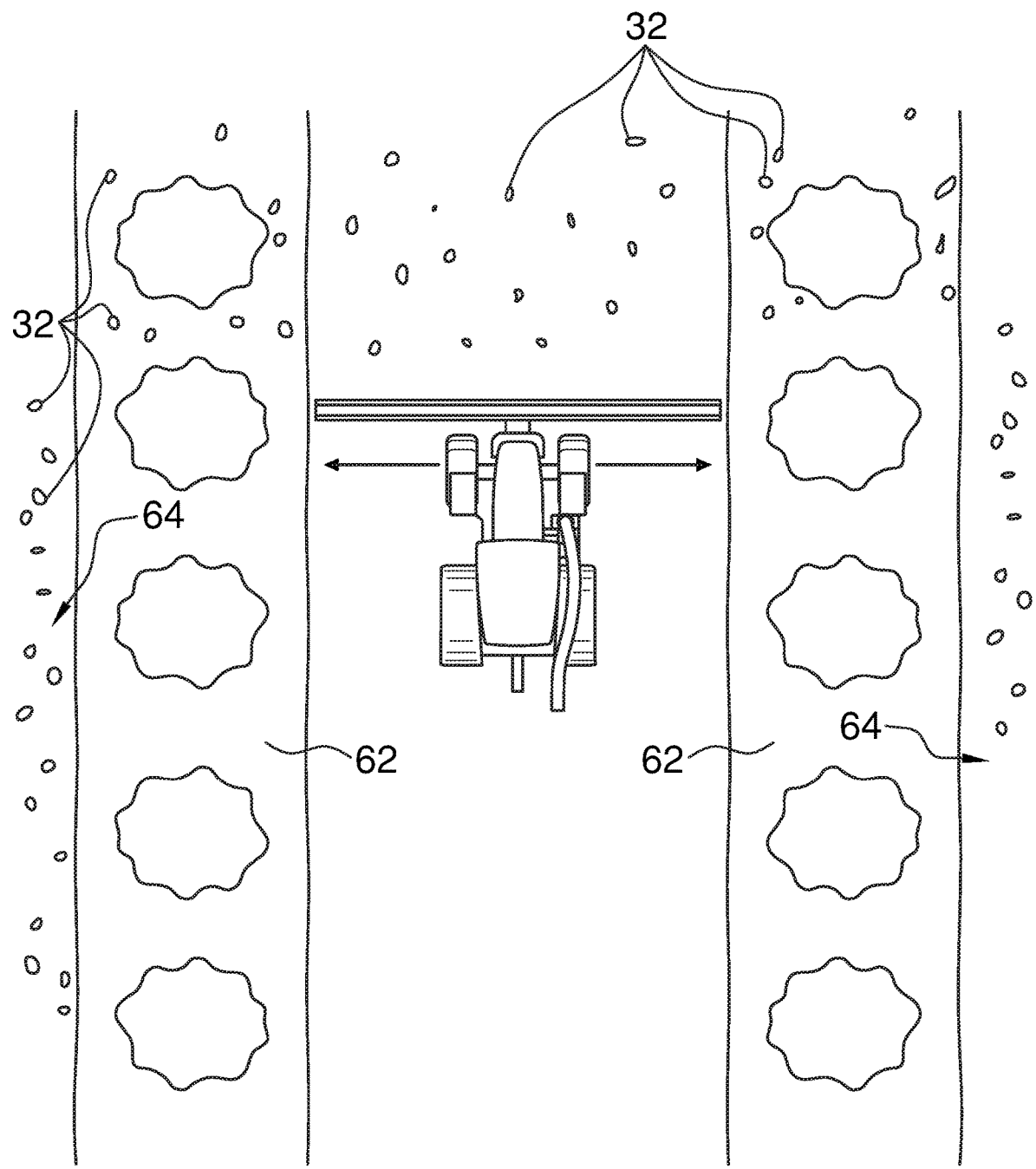
FIG. 7 is a top perspective in-use view of an embodiment of the disclosure.

With reference now to the drawings, and in particular to FIGS. 1 through 7 thereof, a new vacuum device embodying the principles and concepts of an embodiment of the disclosure and generally designated by the reference numeral 10 will be described.

As best illustrated in FIGS. 1 through 7, the harvest vacuum assembly 10 generally comprises a farming implement 12 that has a front end 14 and a back end 16, and the front end 14 has a hydraulic lift 18 thereon for engaging and lifting farming equipment. The hydraulic lift 18 may be a three point hitch or any other type of hydraulic lift that is common to farming implements and the farming implement 12 may be a tractor. The front end 14 has a pair of exhaust vents 19 thereon and each of the exhaust vents 19 directs a flow of air angling laterally away in opposite directions from the front end 19. The farming implement 12 may be a tractor that includes a tow bar 15 on the back end 16 for towing a harvester or other farming equipment. Additionally, the framing implement 12 includes a power take off 17 on the back end 16 that can be coupled to farming equipment for driving the farming equipment.

A vacuum motor 20 is coupled to the farming implement 12 and the vacuum motor 20 has an intake 22 and an exhaust 24. Additionally, the vacuum motor 20 is electrically coupled a power source 26 comprising an electrical system of the farming implement 12. The vacuum motor 20 urging air inwardly through the intake 22 and outwardly through the exhaust 24 when the vacuum motor 20 is turned on. Moreover, the vacuum motor 20 may be an electrical vacuum motor 20 that is capable of generating an air velocity of at least 45.0 m/sec. The exhaust 24 of the vacuum motor 20 is in fluid communication with each of the exhaust vents 19 on the front end 14 for blowing air outwardly through each of the exhaust vents 19.

A suction tube 28 is removably coupled to the hydraulic lift 18 on the front end 14 of the farming implement 12. The suction tube 28 has a suction aperture 30 therein that is directed downwardly toward ground when the suction tube 28 is coupled to the hydraulic lift 18. Moreover, the suction tube 28 is in fluid communication with the vacuum motor 20 such that the vacuum motor 20 urges air inwardly through the suction aperture 30. In this way the suction aperture 30 sucks loose objects 32 from the ground, such as cut hay, cut grain, nuts from the nut trees and any other harvestable loose objects 32 for collection. The exhaust 24 on the vacuum motor 20 is in fluid communication with a harvester 34 that is towed behind the farming implement 12. In this way the vacuum motor 20 transfers the loose objects 32 into the harvester 34 for harvesting. The harvester 34 may be a hay bailer, a combine and any other type of mechanized, agricultural equipment for processing loose objects 32.

The suction tube 28 has a first end 36, a second end 38 and an outer wall 40 extending therebetween. The suction aperture 30 extends through the outer wall 40 and the suction aperture 30 extends between the first 36 and second 38 ends. The suction tube 28 has a length that is not less than a front wheel base of the farming implement 12. A suction port 42 is coupled to the outer wall 40 of the suction tube 28 and the suction port 42 is in fluid communication with the suction aperture 30. A support bar 44 may be coupled to the outer wall 40 of the suction tube 28 and the support bar 44 may extend between the first 36 and second 38 ends for reinforcing the outer wall 40. Additionally, the support bar 44 may be positioned on an opposite side of the outer wall 40 with respect to the suction aperture 30.

A pair of extension tubes 46 is provided and each of the extension tubes 46 has a primary end 48, a secondary end 50 and an exterior wall 52 extending therebetween. The exterior wall 52 of each of the extension tubes 46 has a suction aperture 54 extending therethrough and the suction aperture 54 in each of the extension tubes 46 extends between the primary 48 and secondary 50 ends. The primary end 48 of each of the extension tubes 46 is fluidly coupled to a respective one of the first 36 and second 38 ends of the suction tube 28 having the suction aperture 54 in each of the extension tubes 46 being directed downwardly toward ground. Moreover, each of the extension tubes 46 is in fluid communication with the vacuum motor 20 when the extension tubes 46 are fluidly coupled to the suction tube 28. In this way the extension tubes 46 increases the effective width of area from which the vacuum motor 20 can collect the loose objects 32.

A pair of end caps 56 is each removably coupled to the secondary end 50 of a respective one of the extension tubes 46 when the respective extension tube 46 is fluidly coupled to the suction tube 28. The end cap 56 on the respective extension tube 46 closes the secondary end 50 to inhibit air from passing through the secondary end 50. An intake hose 58 is fluidly coupled between the intake 22 of the vacuum motor 20 and the suction port 42 on the suction tube 28. Thus, the intake hose 58 directs the loose objects 32 into the vacuum motor 20 when the loose objects 32 are sucked into the suction tube 28. An exhaust hose 60 is fluidly coupled between the exhaust 24 of the vacuum motor 20 and the harvester 34 to direct the loose objects 32 into the harvester 34. Alternatively, each of the end caps 56 is positioned on a respective one of the first 36 and second 38 ends of the suction tube 28 when the extension tubes 46 are not coupled to the suction tube 28.

In use, the suction tube 28 is mounted to the hydraulic lift 18 and the intake hose 58 is fluidly coupled between the suction port 42 and the intake 22 on the vacuum motor 20. The exhaust hose 60 is fluidly coupled between the exhaust 24 on the vacuum motor 20 and the harvester 34. The farming implement 12 is driven between rows of nut trees that have been shaken to dislodge nuts from the nut trees. The vacuum motor 20 is turned on and the hydraulic lift 18 is lowered such that the suction tube 28 is positioned near the ground. Thus, the nuts are sucked into the suction aperture 30 in the suction tube 28 and are blown into the harvester 34. In this way the nuts are collected and transferred into the harvester 34 without requiring mechanized collection, such as a hay rake or other forms of mechanized collection common to agriculture. The exhaust vents 19 blow air outwardly therefrom to blow air onto nuts that have collected on a berm 62 upon which the nut trees are planted. In this way the nuts on the berm can be blown into an adjacent row 64 between the nut trees for subsequent collection.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A harvest vacuum assembly being configured to collect loose cuttings from the ground for harvesting, said assembly comprising:

a farming implement having a front end and a back end, said front end having a hydraulic lift thereon for engaging and lifting farming equipment;

a vacuum motor being coupled to said farming implement, said vacuum motor having an intake and an exhaust, said vacuum motor being electrically coupled a power source comprising an electrical system of said farming implement, said vacuum motor urging air inwardly through said intake and outwardly through said exhaust when said vacuum motor is turned on;

a suction tube being removably coupled to said hydraulic lift on said front end of said farming implement, said suction tube having a suction aperture therein being directed downwardly toward ground when said suction tube is coupled to said hydraulic lift, said suction tube being in fluid communication with said vacuum motor such that said vacuum motor urges air inwardly through said suction aperture wherein said suction aperture is configured to suck loose cuttings on the ground for collection, said exhaust on said vacuum being in fluid communication with a harvester being towed behind said farming implement wherein said vacuum is configured to transfer the loose cuttings into the harvester for harvesting, said suction tube having a first end, a second end and an outer wall extending therebetween, said suction aperture extending through said outer wall, said suction aperture extending between said first and second ends, said suction tube having a length being not less than a front wheel base of said farming implement;

a suction port being coupled to said outer wall of said suction tube, said suction port being in fluid communication with said suction aperture; and a pair of extension tubes, each of said extension tubes having a primary end, a secondary end and an exterior wall extending therebetween, said exterior wall of each of said extension tubes having a suction aperture extending therethrough, said suction aperture in each of said extension tubes extending between said primary and secondary ends, said primary end of each of said extension tubes being fluidly coupled to a respective one of said first and second ends of said suction tube having said suction aperture in each of said extension tubes being directed downwardly toward ground, each of said extension tubes being in fluid communication with said vacuum when said extension tubes are fluidly coupled to said suction tube.

2. The assembly according to claim 1, further comprising a pair of end caps, each of said end caps being removably coupled to said secondary end of a respective one of said extension tubes when said respective extension tube is fluidly coupled to said suction tube, said end cap on said respective extension tube closing said secondary end to inhibit air from passing through said secondary end.

3. The assembly according to claim 1, further comprising an intake hose being fluidly coupled between said intake of said vacuum and said suction port on said suction tube wherein said intake hose is configured to direct the loose cuttings into said vacuum when the loose cuttings are sucked into said suction tube.

4. The assembly according to claim 1, further comprising an exhaust hose being fluidly coupled between said exhaust of said vacuum and the harvester wherein said exhaust hose is configured to direct the loose cutting into the harvester.

5. A harvest vacuum assembly being configured to collect loose cuttings from the ground for harvesting, said assembly comprising:

a farming implement having a front end and a back end, said front end having a hydraulic lift thereon for engaging and lifting farming equipment;

a vacuum motor being coupled to said farming implement, said vacuum motor having an intake and an exhaust, said vacuum motor being electrically coupled a power source comprising an electrical system of said farming implement, said vacuum motor urging air inwardly through said intake and outwardly through said exhaust when said vacuum motor is turned on;

a suction tube being removably coupled to said hydraulic lift on said front end of said farming implement, said suction tube having a suction aperture therein being directed downwardly toward ground when said suction tube is coupled to said hydraulic lift, said suction tube being in fluid communication with said vacuum motor such that said vacuum motor urges air inwardly through said suction aperture wherein said suction aperture is configured to suck loose cuttings on the ground for collection, said exhaust on said vacuum being in fluid communication with a harvester being towed behind said farming implement wherein said vacuum is configured to transfer the loose cuttings into the harvester for harvesting, said suction tube having a first end, a second end and an outer wall extending therebetween, said suction aperture extending through said outer wall, said suction aperture extending between said first and second ends, said suction tube having a length being not less than a front wheel base of said farming implement;

a suction port being coupled to said outer wall of said suction tube, said suction port being in fluid communication with said suction aperture;

a pair of extension tubes, each of said extension tubes having a primary end, a secondary end and an exterior wall extending therebetween, said exterior wall of each of said extension tubes having a suction aperture extending therethrough, said suction aperture in each of said extension tubes extending between said primary and secondary ends, said primary end of each of said extension tubes being fluidly coupled to a respective one of said first and second ends of said suction tube having said suction aperture in each of said extension tubes being directed downwardly toward ground, each of said extension tubes being in fluid communication with said vacuum when said extension tubes are fluidly coupled to said suction tube;

a pair of end caps, each of said end caps being removably coupled to said secondary end of a respective one of said extension tubes when said respective extension tube is fluidly coupled to said suction tube, said end cap on said respective extension tube closing said secondary end to inhibit air from passing through said secondary end;

an intake hose being fluidly coupled between said intake of said vacuum and said suction port on said suction tube wherein said intake hose is configured to direct the loose cuttings into said vacuum when the loose cuttings are sucked into said suction tube; and an exhaust hose being fluidly coupled between said exhaust of said vacuum and the harvester wherein said exhaust hose is configured to direct the loose cutting into the harvester.

* * * * *